(12) United States Patent
Yeomans

(10) Patent No.: US 10,773,591 B2
(45) Date of Patent: Sep. 15, 2020

(54) VIDEO ANALYTICS BASED PILOT SAFETY DEVICES

(71) Applicant: FLIR Belgium BVBA, Meer (BE)

(72) Inventor: Christopher Yeomans, Fareham (GB)

(73) Assignee: FLIR BELGIUM BVBA, Meer (BE)

( * ) Notice: Subject to any disclaimer, the term of this patent is extended or adjusted under 35 U.S.C. 154(b) by 76 days.

(21) Appl. No.: 15/716,341

(22) Filed: Sep. 26, 2017

(65) Prior Publication Data

US 2018/0105039 A1    Apr. 19, 2018

Related U.S. Application Data

(60) Provisional application No. 62/409,324, filed on Oct. 17, 2016.

(51) Int. Cl.
| | |
|---|---|
| *B60K 28/04* | (2006.01) |
| *H04N 5/247* | (2006.01) |
| *G06K 9/00* | (2006.01) |
| *G05D 1/00* | (2006.01) |
| *B63B 49/00* | (2006.01) |
| *B63B 35/00* | (2020.01) |

(52) U.S. Cl.
CPC ............. *B60K 28/04* (2013.01); *B63B 49/00* (2013.01); *G05D 1/0061* (2013.01); *G05D 1/0088* (2013.01); *G06K 9/00838* (2013.01); *H04N 5/247* (2013.01); *B63B 2035/009* (2013.01)

(58) Field of Classification Search
CPC ... B60K 28/04; B63B 49/00; B63B 2035/009; G05D 1/0061; G05D 1/0088; G06K 9/00838; H04N 5/247
See application file for complete search history.

(56) References Cited

U.S. PATENT DOCUMENTS

| | | | |
|---|---|---|---|
| 5,838,227 A | 11/1998 | Murray | |
| 6,450,845 B1 | 9/2002 | Snyder et al. | |
| 7,355,518 B1 | 4/2008 | Staerzl | |
| 9,840,258 B1 * | 12/2017 | Swiderski | B60W 40/09 |
| 2007/0051292 A1 * | 3/2007 | Kilbourn | B63B 35/00 |
| | | | 114/311 |
| 2008/0129825 A1 * | 6/2008 | DeAngelis | A63B 24/0021 |
| | | | 348/169 |

(Continued)

FOREIGN PATENT DOCUMENTS

WO      WO 2010/149979      12/2010

OTHER PUBLICATIONS

"Boat Kill Switch Wear Rate Estimated from U.S. Coast Guard BARD Data," Propellersafety.com, 12 pages [online], [retrieved on Jun. 20, 2018]. Retrieved from the Internet: <URL:http://www.propellersafety.com/5066/propeller-statistics/kill-switch-wear-rate-bard/>.

(Continued)

*Primary Examiner* — Michael V Kerrigan
(74) *Attorney, Agent, or Firm* — Haynes and Boone, LLP

(57) ABSTRACT

Various embodiments of the present disclosure may include a vehicle that may detect the presence and/or absence of an operator of the vehicle. The vehicle may determine that the operator is present and/or absent from a control area of the vehicle (e.g., an area where the operator may provide instructions for the piloting of the vehicle) and/or from the entire area of the vehicle and provide instructions responsive to the determination.

20 Claims, 5 Drawing Sheets

(56) References Cited

U.S. PATENT DOCUMENTS

2011/0279673 A1* 11/2011 Teich ..................... B63B 49/00
348/148

OTHER PUBLICATIONS

"Padstow speedboat accident: widow tells of 'big mistake' with kill cord," The Guardian, 4 Pages [online], [retrieved on Jun. 20, 2018]. Retrieved from the Internet: <URL:https://www.theguardian.com/uk-news/2014/nov/10/padstow-speedboat-accident-inquest-victoria-nick-milligan>.

* cited by examiner

VIDEO ANALYTICS BASED PILOT SAFETY DEVICES

CROSS-REFERENCE TO RELATED APPLICATIONS

This application claims the benefit of and priority to U.S. Provisional Patent Application No. 62/409,324 filed Oct. 17, 2016 and entitled "Video Analytics Based Pilot Safety Devices," which is incorporated herein by reference in its entirety.

TECHNICAL FIELDS

One or more embodiments of the invention relate generally to vehicle system devices and more particularly to safety devices utilizing imagers.

BACKGROUND

In certain instances, pilots of vehicles may leave the control area of the vehicle. For example, pilots may take a break, attend to certain systems of the vehicle, and/or leave the control area for other reasons. In certain such instances, the pilot may end up in danger and/or may be prevented from returning to the control area. Such instances may place the pilot and/or the vehicle in danger. For example, the vehicle may continue to be operating after the pilot has left the control area. If the pilot is then unable to return to the control area, the vehicle may continue to move and may, for example, continue moving and potentially hit another object and/or may move away from a stranded pilot.

SUMMARY

Systems and methods are disclosed herein for detection of the absence of operators from a control area of a vehicle. In certain embodiments, a system may include a logic device associated with a vehicle and configured to communicate with an imager. The logic device may be configured to receive image data from the imager, wherein the image data comprises a view of an operating area of the vehicle, to determine an absence of an operator of the vehicle from the operating area based on the image data, and to issue an operator absent instruction based on the determined absence of the operator.

In certain other embodiments, a method may include receiving image data from the imager, wherein the image data comprises a view of an operating area of the vehicle, determining an absence of an operator of the vehicle from the operating area based on the image data, and issuing an operator absent instruction based on the determined absence of the operator.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, systems and methods for detection of the absence of a vehicle operator from a vehicle control area may be discussed. The various systems may include one or more sensors. The sensors may include visual and/or thermal imagers, sonar systems including one or more sonar transducer assemblies, radar systems, other ranging sensor systems, global navigation satellite system (GNSS) systems and/or other position sensors, orientation sensors, gyroscopes, accelerometers, and/or speed sensors providing measurements of an orientation, a position, an acceleration, and/or a speed of the device, the sonar/radar/ranging sensor assemblies, and/or a coupled vehicle, and/or other navigational sensors.

For example, the sensors may be mounted to or within the vehicle (e.g., a watercraft, aircraft, automobile, train, and/or other vehicle), may be integrated with other sensor assemblies, or may be integrated within a portable device. Examples of portable devices include portable GNSS devices, smartphones, tablets, portable computers, portable sensor suites, cameras, and other devices. Embodiments of the present disclosure may detect the presence and/or absence of an operator from a vehicle control area (e.g., driver's seat, cockpit, helm, or other area that the operator may be located in to control the vehicle) and/or from the vehicle as a whole. Upon determining the absence of the operator from the vehicle control area, the system may issue an operator absent instruction. The operator absent instruction may include, for example, a warning message, instructions to operate the vehicle in a certain manner (e.g., power down, stop, and/or attempt to detect the location of the operator within an environment around the vehicle), to provide a warning alarm, or to provide another such response to determination of the absence of the operator.

Figure 1A:
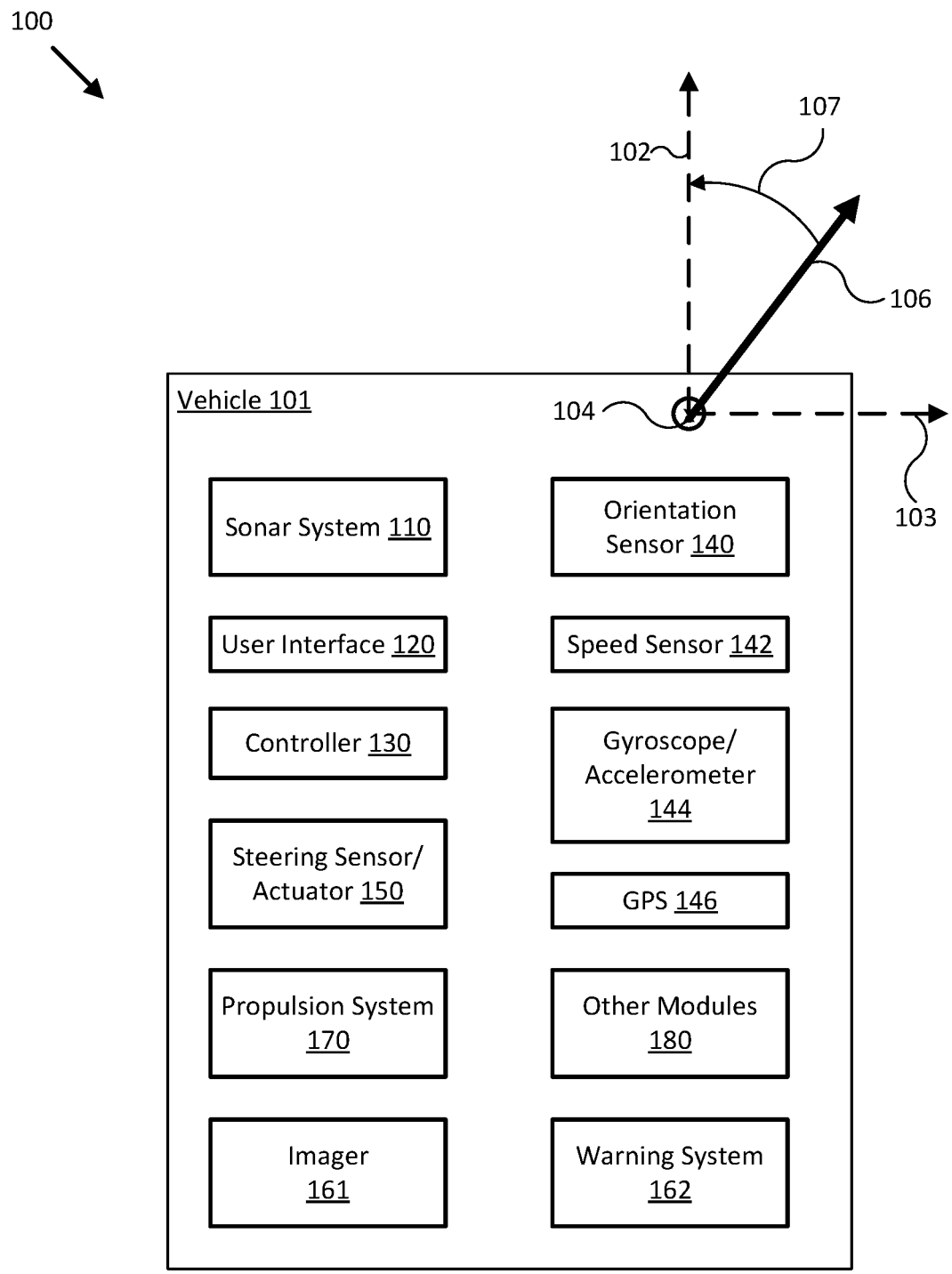
FIG. 1A illustrates a block diagram of a vehicle in accordance with an embodiment of the disclosure.

FIG. 1A illustrates a block diagram of a vehicle in accordance with an embodiment of the disclosure. System 100 may include a vehicle 101 that may include a plurality of sensors that may detect the presence and/or absence of an operator of the vehicle. For example, such sensors may include a sonar system 110, a steering sensor/actuator 150, an orientation sensor 140, a speed sensor 142, a gyroscope/accelerometer 144, a global navigation satellite system (GNSS) 146, imager 161, and/or other modules 180 (i.e., a radar system, other ranging sensors, various environmental sensors, sensors directed towards the dynamic characteristics of the vehicle, and/or other sensors). Vehicle 101 may additionally include a warning system 162. In certain embodiments, a plurality of certain types of the same sensor may be included within system 100.

In some embodiments, vehicle 101 may display messages, warnings, and/or other outputs (e.g., a warning alarm) through user interface 120 and/or warning system 162, and/or use sensor data and/or imagery to control operation of vehicle 101, such as controlling steering actuator 150 and/or propulsion system 170 to steer vehicle 101 according to a desired heading, such as heading angle 107, for example. In certain such examples, vehicle 101 may detect the presence of the operator in the environment around vehicle 101 via, for example, sonar system 110, GPS 146, other modules 180, and/or other sensors.

In one embodiment, system 100 may include one or more of sonar system 110, user interface 120, controller 130, orientation sensor 140, speed sensor 142, gyroscope/accelerometer 144, GNSS 146, steering sensor/actuator 150, propulsion system 170, imager 161, warning system 162, and one or more other sensors and/or actuators, such as other modules 180. In some embodiments, one or more of the elements of system 100 may be implemented in a combined housing or structure that can be coupled to vehicle 101 and/or held or carried by a user of vehicle 101.

Directions 102, 103, and 104 describe one possible coordinate frame of vehicle 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of vehicle 101, direction 103 illustrates a direction that may be substantially parallel to and/or aligned with a lateral axis of vehicle 101, and direction 104 illustrates a direction that may be substantially parallel to and/or aligned with a vertical axis of vehicle 101, as described herein. For example, a roll component of motion of vehicle 101 may correspond to rotations around direction 102, a pitch component may correspond to rotations around direction 103, and a yaw component may correspond to rotations around direction 104. In certain embodiments, instructions to pilot vehicle 101 (e.g., to return to a last known area where the operator was present) may be issued according to instructions to head in directions 102, 103, and/or 104.

In certain embodiments, orientation and/or position sensors (OPSs) may be included on vehicle 101. The OPSs may be individually coupled to vehicle 101 or may be contained within other modules and systems such as sonar system 110 and various imaging systems. The orientation and/or position sensors may detect the roll, pitch, and/or yaw of vehicle 101 and output data related to the roll, pitch, and/or yaw to controller 130. Controller 130 may then utilize roll, pitch, and/or yaw to correct data obtained by various sensors and systems coupled to vehicle 101 (e.g., sonar, radar, and/or other ranging sensor systems, and/or other sensors). For example, sonar data of a seafloor may be significantly affected by roll, pitch, and/or yaw of a vehicle because emitted sonar pulses may then travel to the ocean floor at an angle, which can significantly increase the detected distance. Using data related to corresponding angles of roll, pitch, and/or yaw, controller 130 may then correct or otherwise adjust such erroneous readings.

Heading angle 107 may correspond to the angle between a projection of a reference direction 106 (e.g., the local component of the Earth's magnetic field) onto a horizontal plane (e.g., referenced to a gravitationally defined "down" vector local to vehicle 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of vehicle 101. In various embodiments, an absolute coordinate frame may be defined and/or correspond to a coordinate frame with one or more undefined axes, such as a horizontal plane local to vehicle 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as object detection, bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Also, vehicle 101 may require highly detailed information in order to determine the presence of the operator and/or another person in the water. Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from vehicle 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, vehicle speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, vehicle 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for vehicle 101. In such an embodiment, controller 130 may be configured to control the actuators associated with the transducer assembly to maintain its orientation relative to, for example, vehicle 101 and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of vehicle 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110. Still other embodiments may not include sonar system 110, but may include other sensor assemblies and other components.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an image and/or video, a sonar signal, and/or a radar signal and/or an orientation, an angular velocity, an acceleration, a speed, and/or a position of vehicle 101. In such embodiment, user interface 120 may be adapted to process the images, videos, sonar signals, radar signals, and/or other signals to determine the presence and/or absence of the operator, process the sensor signals to determine sensor information indicating an estimated and/or absolute roll, pitch, and/or yaw (attitude and/or rate), and/or a position or series of positions of vehicle 101, for example, and display the sensor information as feedback to a user and/or as a warning and/or other output to vehicle 101.

In some embodiments, user interface 120 may be adapted to accept user input such as warning instructions and/or instructions for the vehicle response upon detecting the absence of the operator. In further embodiments, user interface 120 may be adapted to accept user input including a user-defined target attitude for an actuated device (e.g., sonar system 110 and/or imager 161) coupled to vehicle 101, for example, and to generate control signals for adjusting an orientation of the actuated device according to the target attitude. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of vehicle 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, vehicle 101, imager 161, warning system 162, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of vehicle 101 and/or system 100. In some embodiments, a control loop may include processing sensor signals and/or sensor information in order to control one or more operations of vehicle 101 and/or various elements of system 100.

Orientation sensor 140 may be implemented as one or more of a compass, float, accelerometer, magnetometer, and/or other digital or analog device capable of measuring an orientation of vehicle 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for vehicle 101. In other embodiments, orientation sensor 140 may be adapted to provide roll, pitch, and/or yaw rates for vehicle 101 (e.g., using a time series of orientation measurements). Orientation sensor 140 may be positioned and/or adapted to make orientation measurements in relation to a particular coordinate frame of vehicle 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of vehicle 101 (e.g., in a surrounding medium and/or aligned with a longitudinal axis of vehicle 101) and providing such measurements as sensor signals that may be communicated to various devices of system 100. In some embodiments, speed sensor 142 may be adapted to provide a velocity of a surrounding medium relative to sensor 142 and/or vehicle 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of vehicle 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of vehicle 101, for example. In various embodiments, gyroscope/accelerometer 144 may be implemented in a common housing and/or module to ensure a common reference frame or a known transformation between reference frames.

GNSS 146 may be implemented according to any global navigation satellite system (GNSS), including a GPS, GLONASS, and/or Galileo based receiver and/or other device capable of determining absolute and/or relative position of vehicle 101 (e.g., or an element of vehicle 101 and/or system 100, such as sonar system 110 and/or user interface 120) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 146 may be adapted to determine a velocity, speed, and/or yaw rate of vehicle 101 (e.g., using a time series of position measurements), such as an absolute velocity and/or a yaw component of an angular velocity of vehicle 101. In various embodiments, one or more logic devices of system 100 may be adapted to determine a calculated speed of vehicle 101 and/or a computed yaw component of the angular velocity from such sensor information.

Steering sensor/actuator 150 may be adapted to physically adjust a heading of vehicle 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of vehicle 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to vehicle 101. In some embodiments, propulsion system 170 may be non-articulated, for example, such that the direction of motive force and/or thrust generated by propulsion system 170 is fixed relative to a coordinate frame of vehicle 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of vehicle 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Imager 161 may include one or more visual, thermal, and/or other types of cameras and/or video recorders. Imager 161 may be configured to image still frames, a sequence of frames, and/or video in visual, thermal, and/or other spectral bands. Imager 161 may output data associated with the images and/or video to, for example, controller 130 for processing. Controller 130 may then, for example, determine the presence and/or absence of an operator of vehicle 101 within a field of view of imager 161. In certain embodiments, imager 161 and/or other modules may be configured to be actuated to move between, at least, a plurality of positions.

In various embodiments, controller 130 may be configured to determine the presence and/or absence of the operator by, for example, analyzing the image(s) and/or video. Analysis may include, for example, detecting the presence of an object similar to the size of the operator, detecting the presence of an object with the temperature of a human, determining movement of an object, and/or other techniques to detect the presence and/or absence of the operator. For example, controller 130 may determine the absence of the operator if it does not detect the presence of an object similar to the size of the operator, the presence of an object with the temperature of a human, movement of an object, and/or other operator characteristic within the data output by imager 161. In certain additional embodiments, controller 130 may determine a historical movement pattern of the operator (e.g., may determine a likelihood that the operator may be present and/or moving at, for example, the time of day or during a period of operation of vehicle 101) and may determine the absence of the operator if the operator significantly deviates from the movement pattern.

In certain embodiments of system 100, vehicle 101 may include a plurality of imagers 161. The plurality of imagers 161 may be located in separate locations of vehicle 101. The plurality of imagers 161 may include one or more locations. In certain embodiments, two or more imagers 161 may, alternatively or additionally, image one area or may have overlapping fields of view and/or image one or more spectrums.

Warning system 162 may include one or more devices that may broadcast a warning responsive to determining the absence of the operator from the control area of vehicle 101. Warning system 162 may be, for example, a communications device that may broadcast a warning to a secondary electronic device (e.g., a cellphone, tablet, computer, wearable device, remote device, and/or other electronic device) and/or entity (e.g., Coast Guard and/or ownership group of vehicle 101), a warning light, a warning alarm, and/or other such warning systems.

Other modules 180 may include other and/or additional sensors, actuators, communications modules/nodes, and/or user interface devices used to provide additional environmental information of vehicle 101, for example. In some embodiments, other modules 180 may include a humidity sensor, a wind and/or water temperature sensor, a barometer, a radar system, a visible spectrum camera, an infrared camera, LIDAR systems, a salinity sensor such as a sea surface salinity sensor, and/or other environmental sensors providing measurements and/or other sensor signals that can be displayed to a user and/or used by other devices of system 100 (e.g., controller 130) to provide operational control of vehicle 101 and/or system 100 that compensates for the absence of the operator, environmental conditions, such as wind speed and/or direction, swell speed, amplitude, and/or direction, and/or an object in a path of vehicle 101, for example.

In some embodiments, other modules 180 may include one or more actuated devices (e.g., spotlights, infrared and/or visible light illuminators, infrared and/or visible light cameras, radars, sonars, LIDAR systems, and/or other actuated devices) coupled to vehicle 101, where each actuated device includes one or more actuators adapted to adjust an orientation of the device, relative to vehicle 101, in response to one or more control signals (e.g., provided by controller 130). Additionally, other modules 180 may also include orientation and/or position sensors associated with sensors of the other modules 180. The orientation and/or position sensors may be incorporated within the sensors of other modules 180, or may be separate from the sensors of other modules 180.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for vehicle 101, using one or more power leads. Such power leads may also be used to support one or more communication techniques between elements of system 100.

Figure 1B:
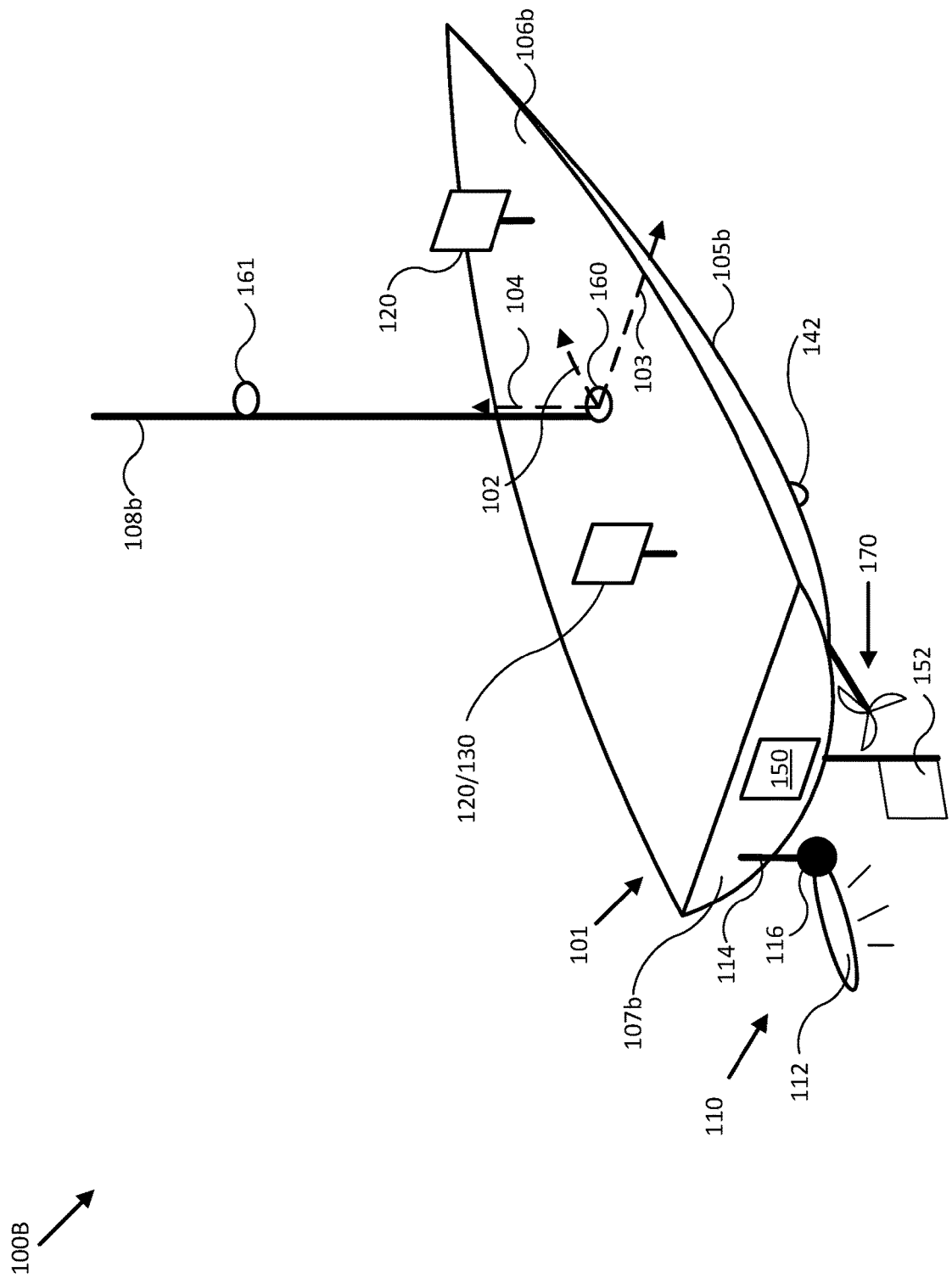
FIG. 1B illustrates an example vehicle in accordance with an embodiment of the disclosure.

FIG. 1B illustrates an example vehicle in accordance with an embodiment of the disclosure. System 100B of FIG. 1B may include sonar system 110, integrated user interface/controller 120/130, secondary user interface 120, steering sensor/actuator 150, sensor cluster 160 (e.g., orientation sensor 140, gyroscope/accelerometer 144, GNSS 146, imager 161, warning system 162, and/or other modules 180 such as radar systems), imager 161, and various other sensors and/or actuators. In the embodiment illustrated by FIG. 1B, vehicle 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, vehicle 101 includes actuated sonar system 110, which in turn includes transducer assembly 112 coupled to transom 107b of vehicle 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of vehicle 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of vehicle 101, using one or more orientations and/or positions of vehicle 101 and/or other sensor information derived by executing various methods described herein.

In another embodiment, user interface/controller 120/130 may be configured to receive data from imager 161 and determine the absence of the operator from a control area of vehicle 101 and/or verify that an operator is still present. Imager 161 may include one or more visual spectrum cameras and/or thermal spectrum cameras. In certain embodiments, interface/controller 120/130 may make such determinations via one or more devices and may, for example, include multiple detection systems working independently and/or cooperatively.

Interface/controller 120/130 may, for example, be configured to determine when a person is in a field of view of imager 161. Imager 161 may image a designated location (e.g., an operating area of vehicle 101 and/or another area of vehicle 101). In certain embodiments, imager 161 may be configured to image a plurality of designated locations. In such embodiments, imager 161 may, thus, move and/or switch configurations to image each of the plurality of locations. For example, imager 161 may be configured to periodically image each of the locations, may switch between the locations according to instructions from a user and/or interface/controller 120/130, may be configured to switch between the locations responsive to detected conditions, and/or may switch responsive to other determinations.

If interface/controller 120/130 determines the presence of the operator within the designated location, system 100 or components thereof (e.g., a steering wheel or throttle controls) may operate normally. If interface/controller 120/130 determines the absence of the operator within the designated location, interface/controller 120/130 may place system 100 or components thereof in an appropriate mode responsive to the determination and/or activate external systems. For example, interface/controller 120/130 may be configured to bring vehicle 101 to a halt, place propulsion system 170 in neutral, and/or change an attitude of vehicle 101 (e.g., level out flight, hover or some other appropriate operating mode) and/or place vehicle 101 in another such appropriate operating mode. In certain embodiments, system 100 may stop operating or engage interlocks (e.g., lock-outs) to prevent operation of vehicle 101 (e.g., prevent inputs and/or ignore inputs that may operate vehicle 101).

In certain embodiments, imager 161 may record one or more images and/or a video for later analysis. Such embodiments, may, for example, record such videos upon determination of an absence of the operator, detection of a possible accident (e.g., responsive to detected forces), and/or detection of another event such that the images and/or video may be used at a latter period for analysis and/or training.

In certain embodiments, one or more imagers 161 may be used to track an object and/or individual around a predetermined area. Such embodiments may allow an operator to move around vehicle 101 without interface/controller 120/130 falsely determining the absence of the operator. For example, such embodiments may be used to monitor a fisherman preparing fishing equipment on route to a fishing ground or while pulling in fishing nets. In such an example, while interface/controller 120/130 may not make an operator absent determination if the operator is manipulating fishing equipment, it may make such an absence determination if the fisherman fell or was dragged over board. Responsive to such an absence determination, the propulsion system of vehicle 101 may be put in neutral and any winch operation stopped.

In certain embodiments and/or situations, an imager's view may be obscured. In certain such embodiments, an additional imager imaging at least the same location may be installed. Interface/controller 120/130 may be configured to receive data from the plurality of imagers to determine, from the data from the plurality of imagers imaging at least the same location, the presence and/or absence of the operator. For example, if people walk between one imager and the operator, interface/controller 120/130 may determine from data from another imager that the operator is still present. Additional examples of situations where the imager may be obscured include, for example, moving platforms or sails obscuring the view and/or the sun shining into the field of view of an imager.

Multiple imagers may also be used where high reliability may be important. In certain situations, interface/controller 120/130 may include algorithms for a voting system and the voting system may be used to determine if the operator is still located in the vehicle control area. As such, interface/controller 120/130 may analyze data from each of the imagers and determine, from data from the multiple imagers, the presence and/or absence of the operator. Interface/controller 120/130 may require that data from a specific number of such imagers show the absence of the operator in order to determine that the operator is actually absent before transmitting an operator absent warning and/or operating vehicle 101 and/or elements thereof in a specific operating mode (e.g., issuing operator absent instructions). Accordingly, there is less risk of false positives resulting from failure and/or error from any single imager. Additionally, a plurality of different detection algorithms may be used to analyze data from each of the imagers. As such, a predetermined threshold number of such different algorithms may need to determine the absence of the operator before the operator may be determined absent.

In certain embodiments, additionally or alternatively, other algorithms may be used so that the absence of the operator is only determined after a specific set of conditions are met. For example, if vehicle 101 or elements thereof are in a state that is considered safe, then operator absent instructions may not be issued. An illustrative example may be, if interface/controller 120/130 determines that propulsion system 170 of vehicle 101 is in neutral and the speed of vehicle 101 is close to zero when the operator is determined to be absent from the control area, then the operator absent instructions may not be issued. In certain such examples, interface/controller 120/130 may further determine that the operator may be in another portion of vehicle 101. As such, for example, interface/controller 120/130 may determine, if vehicle 101 is a fishing boat and the operator is a helmsman, that the helmsman has moved to secure the boat (e.g., to dock) and thus does not issue operator absent instructions.

In embodiments where interface/controller 120/130 receives data from visual, thermal, and/or other spectral bands, interface/controller 120/130 may, in certain situations, disregard one type of spectral band responsive to detected conditions. For example, if ambient light levels are detected to drop below a threshold level (via, for example, a light sensor, visual camera, and/or other imager) such that a visual imager cannot be effective, then interface/controller 120/130 may only utilize data from thermal imagers. Also, if the thermal signature of the operator is determined to be obscured, then interface/controller 120/130 may ignore data from thermal imagers. For example, on cold days when the operator may be wearing extra insulating clothing, or when exhaust from a heating system is present between the thermal imager and the operator, interface/controller 120/130 may ignore data from thermal imagers. Such decisions to ignore one or more imagers may be determined by interface/controller 120/130, or may be responsive to inputs from a user.

In certain additional embodiments, when interface/controller 120/130 detects that light levels are too low for a visual imager, the visual imager may include a light and/or a low light illuminator that may be turned on and/or automatically powered to a predetermined threshold level to image at least portions of the field of view of the imager. In certain such embodiments, the light and/or low light illuminator may be adjusted to a level that may be used to reliably illuminate and detect the operator, but may not be substantially brighter than a pre-determined level that would significantly compromise the operator's night vision.

In certain embodiments, output of the operator absent instructions may be disabled responsive to, for example, inputs from an operator. The instructions to disable the operator absent instructions may be for a fixed period of time, adjustable by the user (e.g., toggled by the user), or automatic responsive to certain determinations. Such determinations may be based on, for example, detected speeds, yaw rates, or distances traveled, and/or other such factors. For example, an operator absent instruction may include, for example, instructions for a watercraft to circle around after an operator that has fallen out of the watercraft. Such an instruction may be disabled for a period of time when a determination is made that the watercraft is in an area that would not allow the watercraft to complete a quarter or half circle turn. If it is later determined that the watercraft is then able to perform the quarter or half circle turn, the instruction may then be communicated. In another embodiment, if interface/controller 120/130 determines that the operator has left a control area of the vehicle, but that communication of the operator absent instruction has been disabled, interface/controller 120/130 may re-enable communication of the operator absent instruction to avoid dangerous and/or damaging situations. Examples of such situations may include if a watercraft is performing a steady turn, or if brakes for a parked tractor have been released and the tractor has started to roll, an operator absent instruction to stop movement of the watercraft and/or tractor may be communicated.

In some situations, it may be appropriate to provide a warning that interface/controller 120/130 can no longer detect the operator. In certain embodiments, the warning may include a message that interface/controller 120/130 may activate a protection mechanism after a delay period. The protection mechanism may include, for example, instructions to place vehicle 101 into neutral, to stop vehicle 101, and/or to operate vehicle 101 in another similar safety manner. Interface/controller 120/130 may provide a warning that may include an option for the operator and/or another person to acknowledge the warning and perform appropriate actions such as return to the monitored area and/or disable the protection system before the delay period expires.

In one embodiment, user interfaces 120 may be mounted to vehicle 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to vehicle 101 and be mobile/portable throughout a user level (e.g., deck 106b) of vehicle 101. For example, a secondary user interface 120 may be implemented with a lanyard, strap, headband, and/or other type of user attachment device and be physically coupled to a user of vehicle 101 so as to be in proximity to the user and vehicle 101. Other embodiments of the user interface 120 may include a portable device that is not physically coupled to the user and/or vehicle 101. In various embodiments, user interface 120 may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 142 may be mounted to a portion of vehicle 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of vehicle 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for vehicle 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, vehicle 101 includes direction/longitudinal axis 102, direction/lateral axis 103, and direction/vertical axis 104 meeting approximately at mast/sensor mount 108b (e.g., near a center of gravity of vehicle 101). In one embodiment, the various axes may define a coordinate frame of vehicle 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or vehicle 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for vehicle 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
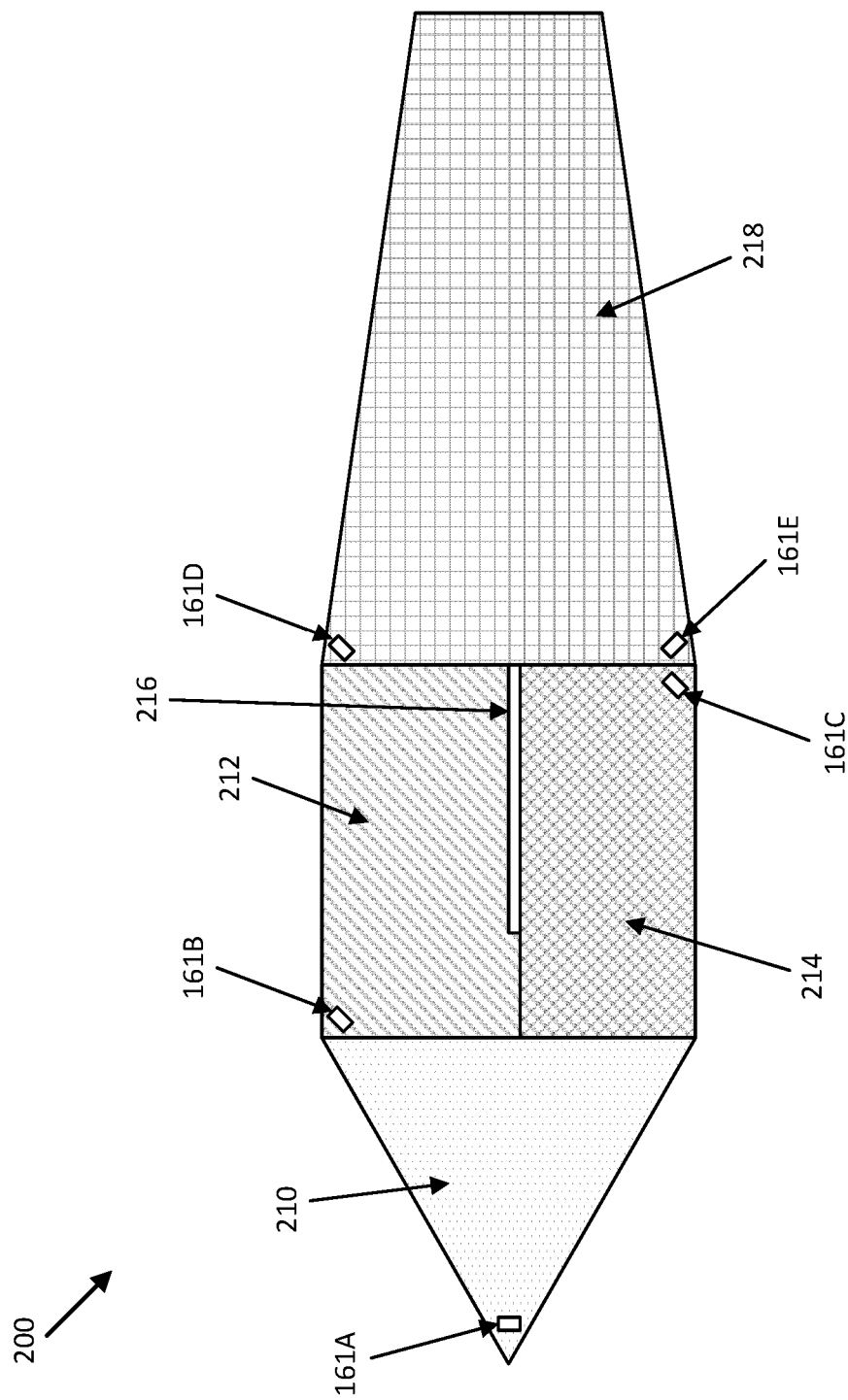
FIG. 2 illustrates a simplified top view of an example vehicle in accordance with an embodiment of the disclosure.

FIG. 2 illustrates a simplified top view of an example vehicle in accordance with an embodiment of the disclosure. FIG. 2 illustrates a vehicle 200 that may be, for example, a watercraft such as a boat. Vehicle 200 may include a plurality of different regions, such as regions 210, 212, 214, and 218. Each region may be a different portion of vehicle 200 that may be assessable by personnel operating vehicle 200. In certain embodiments, region 210 may be a bow of the boat (e.g., a deck on the bow of the boat). Regions 212 and 214 may be portions of a bridge of the boat (e.g., a control area of vehicle 200). Regions 212 and 214 may be separated by a wall 216. Region 218 may be a stern of the boat (e.g., a deck on the stern of the boat).

Vehicle 200 may include imagers 161A-E that may image the regions 210, 212, 214, and 218. Imager 161A may be configured to image the region 210. Imager 161B may be configured to image the region 212. In certain embodiments of vehicle 200 (e.g., vehicles without wall 216), imager 161E may be configured to image both regions 212 and 214. In the embodiment shown in FIG. 2, region 214 may be imaged by imager 161C. In certain additional embodiments, imager 161B may be configured to image at least a portion of region 214 and/or imager 161C may image at least a portion of region 212. Imagers 161D and 161E may image region 218. Having both imagers 161D and 161E image region 218 may allow for redundancy in the event of failure of one of the cameras and/or in the event that one of the cameras is obscured. In certain other embodiments, one or more imagers may, additionally or alternatively, be configured to image an environment around vehicle 200 (e.g., a body of water around vehicle 200).

As an operator moves between regions of vehicle 200 (e.g., from region 212 to region 214), the imagers of vehicle 200 may track and/or detect the presence of the operator in the different regions. As such, while the operator is in region 212, imager 161B may image the operator. When the operator moves to region 214, imager 161C may image the operator in region 161C. In certain embodiments, regions 212 and 214 may collectively constitute the control area of the vehicle 200. As such, if the operator is detected, by, for example, imagers 161B and/or 161C in regions 212 and/or 214, the operator may be determined to be in the control area of vehicle 200 and the operator absent instruction may not be issued. If imagers 161A or 161D and/or 161E detect the presence of the operator in regions 210 and 218, the operator may be determined to have left the control area. As such, the operator absent instruction (e.g., a warning message) may be issued. Additionally, if none of imagers 161A-E detect the presence of the operator in regions 210, 212, 214, and 218, the operator may be determined to have a left the control area as well as vehicle 200. Such a determination may result in a higher priority operator absent instruction (e.g., putting vehicle 200 into neutral) may be issued.

Figure 3:
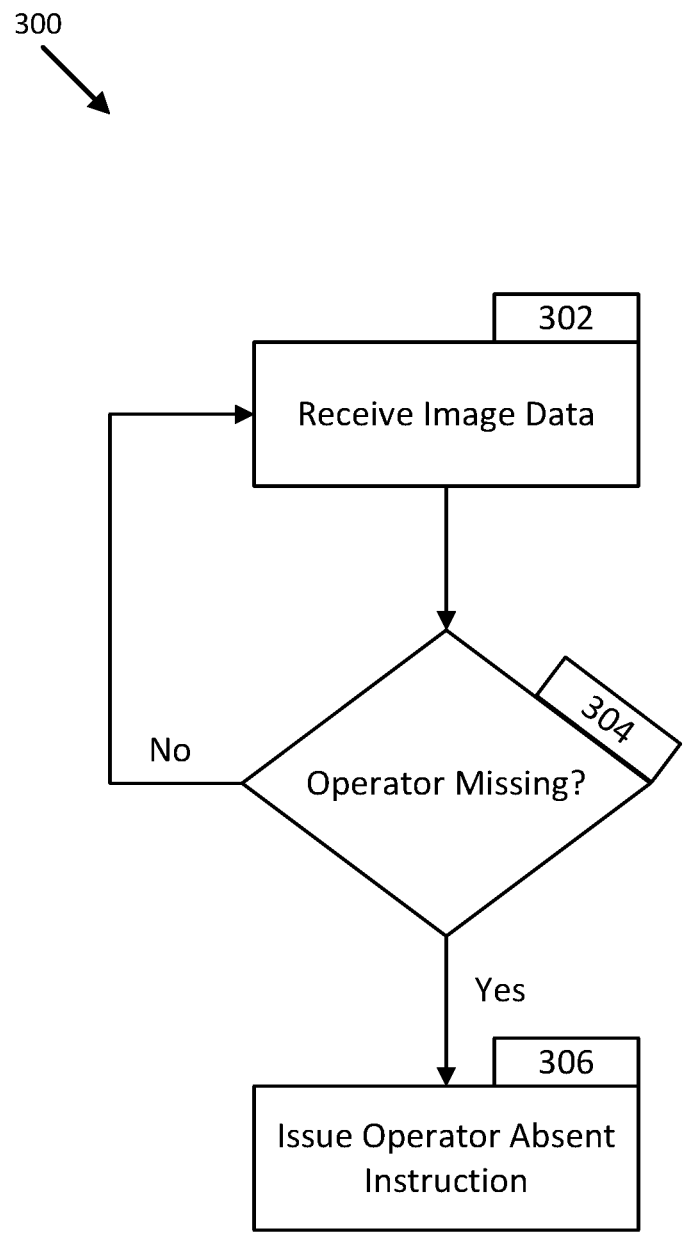
FIG. 3 is a flowchart detailing a process for determining the absence of an operator from a command area of a vehicle in accordance with an embodiment of the disclosure.

FIG. 3 is a flowchart detailing a process for determining the absence of an operator from a command area of a vehicle in accordance with an embodiment of the disclosure. In some embodiments, the operations of processes 300 and/or 400 (of FIG. 4) may be implemented as software instructions executed by one or more logic devices associated with corresponding electronic devices, sensors, and/or structures depicted in FIGS. 1A, 1B, and 2. More generally, the operations of process 300 and 400 may be implemented with any combination of software instructions and/or electronic hardware (e.g., imagers, warning systems, propulsion systems, GPS, speed sensors, user interfaces, steering sensors, sonar systems, orientation systems, and/or other such hardware). It should be appreciated that any step, sub-step, sub-process, or block of process 300 and/or 400 may be performed in an order or arrangement different from process 300 and/or 400. For example, in other embodiments, one or more blocks may be omitted from the process 300 and/or 400, and/or other blocks may be included. Furthermore, block inputs, block outputs, various sensor signals, sensor information, calibration parameters, and/or other operational parameters may be stored to one or more memories prior to moving to a following portion of process 300 and/or 400. Although process 300 and/or 400 is described with reference to systems 100 and 100B and vehicle 200 of FIGS. 1A, 1B, and 2, process 300 and/or 400 may be performed by other systems and including a different selection of electronic devices, sensors, assemblies, and/or antenna arrangements. At the initiation of process 300 and/or 400, various system parameters may be populated by prior execution of a process similar to process 300 and/or 400, for example, or may be initialized to zero and/or one or more values corresponding to typical, stored, and/or learned values derived from past operation of process 300 and/or 400, as described herein.

In block 302, a logic device may receive image data from one or more imagers. For example, controller 130 may receive and/or be configured to receive image data from one or more imagers 161. In certain embodiments, controller 130 may also receive and/or be configured to receive data from additional components, such as sonar system 110, other modules 180, and/or other components. In various embodiments, controller 130 may receive such data from the various components through wireless interfaces, wired interfaces, and/or other such techniques before moving to block 304.

In block 304, whether the operator is present or absent in the control area and/or within any portion of the vehicle may be determined. Such a determination may be made by, for example, controller 130 analyzing the image data received in block 304. In various embodiments, controller 130 may analyze image data from one, some, or all of the imagers and/or other components received in block 302 to determine whether the operator is present or absent. In certain embodiments, the operator may be determined to be present or absent through analysis of, for example, thermal image data to determine whether an object roughly the size of a human with at least a portion of the object with a surface temperature within a skin temperature range of a human is present or absent in the image data. Other embodiments may, additionally or alternatively, recognize human sized and/or shaped objects in visual image, and/or determine whether the operator is present or absent through other techniques prior to moving to block 306.

If the operator is determined to be missing in block 304, an operator absent instruction may be issued in block 306. In certain embodiments, controller 130 may, before issuing the operator absent instruction, determine an operating condition of system 100. For example, in certain embodiments, controller 130 may determine whether vehicle 101 is moving or stationary. If vehicle 101 is moving and the operator is determined to be missing, controller 130 may issue an operator absent instruction to stop vehicle 101. If vehicle 101 is stationary, controller 130 may not issue an operator absent instruction to stop vehicle 101.

The operator absent instruction may include, for example, a message transmitted to a secondary device indicting the absence of the operator, triggering an alarm (e.g., klaxon, lights, and/or another such alarm) within the vehicle indicating the absence of the operator, transmitting an indication of the absence of the operator to a third party (e.g., a Coast Guard), shutting off the propulsion system of the vehicle, controlling the vehicle in an auto-pilot mode (e.g., piloting it to travel at a steady velocity, level attitude, constant heading, to circle an area, and/or other such commands), detecting the presence of the operator within an environment surrounding the vehicle and piloting the vehicle towards the location of the operator, stopping the vehicle (e.g., applying brakes), and/or other such instructions. If the operator is not determined to be missing in block 304, monitoring may continue by receiving image data in block 302.

Figure 4:
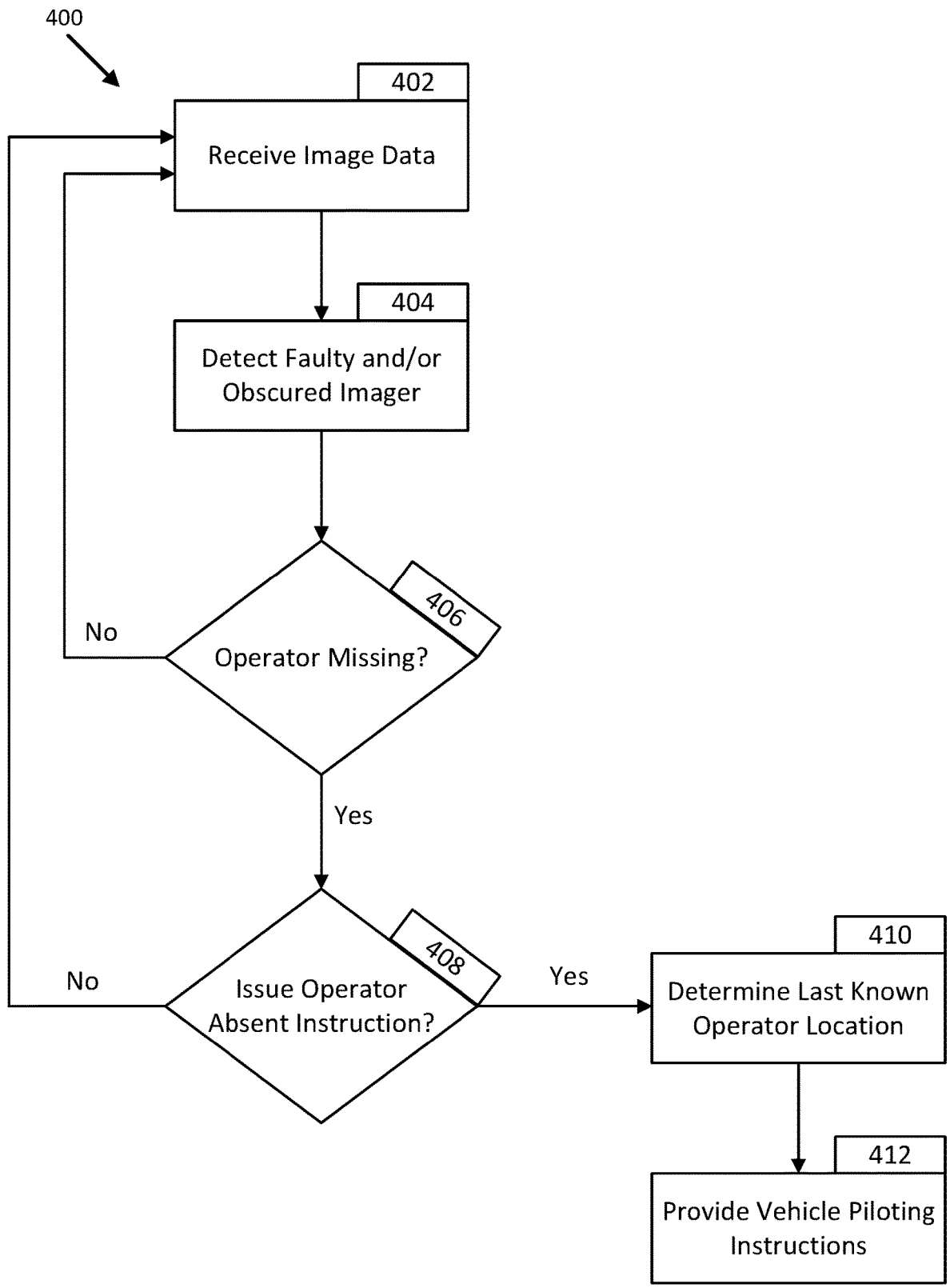
FIG. 4 is a flowchart further detailing a process for determining the absence of an operator from a command area of a vehicle in accordance with an embodiment of the disclosure.

FIG. 4 is a flowchart further detailing a process for determining the absence of an operator from a command area of a vehicle in accordance with an embodiment of the disclosure. The operations of process 400 may be implemented as software instructions executed by one or more logic devices associated with corresponding electronic devices, sensors, and/or structures depicted in FIGS. 1A, 1B, and 2, as described herein.

Image data may be received in block 402, similar to block 302, prior to block 404. A determination of whether one or more of the imagers are faulty or obscured may be made in block 404. Such a determination may be made periodically, continuously, and/or according to certain commands (e.g., according to commands issued by the controller, a user, and/or by another entity) by, for example, controller 130 through analysis of image data received. In various embodiments, whether the imager is faulty and/or obscured may be determined by, for example, analyzing the image data (e.g., whether images are being outputted, whether the image data shows a coherent image, whether the image data shows a blank image, and/or another such technique), testing the electronics of the imager, running diagnostic software and/or algorithms, and/or another such technique, prior to moving to block 406.

In block 406, a determination may be made as to whether the operator is missing in the control area and/or within any other portion of the vehicle. Such a determination may be made by, for example, controller 130 analyzing image data of all imagers and/or image data of imagers determined to not be faulty, similar to the technique described in block 304.

If the operator is determined to not be missing in block 406, the process may return to block 402. If the operator is determined to be missing in block 406, an operator missing instruction may be issued in block 408. In certain embodiments, controller 130 may further determine whether to issue the operator missing instruction in block 408. For example, controller 130 may determine an operating state of vehicle 101 and, responsive to the determination of the operating state, determine whether to issue or not issue the operator missing instruction. The operator missing instruction issued in block 408 may be similar to that issued in block 306 and may include, for example, a message transmitted to a secondary device (e.g., an electronic device of the operator and/or other third party such as a smartphone, laptop, wearable electronic device, and/or other such device) indicating the absence of the operator, triggering an alarm of warning system 162 (e.g., klaxon, lights, and/or another such alarm) within the vehicle indicating the absence of the operator, transmitting an indication of the absence of the operator to a third party (e.g., a Coast Guard), shutting off the propulsion system of the vehicle, controlling the vehicle in an auto-pilot mode (e.g., piloting it to travel at a steady velocity, level attitude, constant heading, to circle an area, and/or other such commands), detecting the presence of the operator within an environment surrounding the vehicle and piloting the vehicle towards the location of the operator, stopping the vehicle (e.g., applying brakes), and/or other such instructions.

In process 400, responsive to issuing operator absent instructions in block 408, a last known location of the operator may be determined in block 410. In certain other embodiments, controller 130 may determine the last known location of the operator responsive to a determination that the operator is missing and/or may be continuously determined. The last known location may be, for example, a location of the operator on a portion of the vehicle, a location of the operator within an environment around the vehicle, and/or a location of the operator in another portion on or off the vehicle. In certain embodiments, the last known location of the operator may be determined by, for example, imagers, position sensing devices (e.g., a GNSS device), environmental sensors, and/or other such devices of the vehicle. For example, in certain such embodiments, the last known operator location may be a position (e.g., global position) of vehicle 101 when imagers and/or modules of vehicle 101 last detected the presence of the vehicle on or within vehicle 101 and/or within an environment around vehicle 101 (e.g., determined from sonar data, visual, thermal, and/or other spectral data from imagers mounted on an interior and/or exterior of vehicle 101, and/or other such data). In certain embodiments, the last known location may be determined by, for example, continuously monitoring the location of vehicle 101 and noting the location of vehicle 101 when the operator is first determined to be absent. In other embodiments, the last known location may be determined by, for example, determining the location of vehicle 101 when a presence of the operator was last detected on and/or around vehicle 101. In such embodiments, such locations may be determined by, for example, analyzing cached data. The last known location of the operator or a determination that the last known location of the operator is unknown may be determined by controller 130 prior to the process proceeding to block 412.

In block 412, vehicle piloting instructions may be provided. For example, controller 130 may issue vehicle piloting instructions that may include, for example, instructions to power down the vehicle, instructions to stop the vehicle, instructions to maintain a heading and/or velocity of the vehicle (e.g., place the vehicle in an autopilot mode), instructions to pilot the vehicle back to the last known location of the operator and/or a proximate area of the last known location of the operator, and/or other instructions to find the operator, aid in locating the operator, safely operate the vehicle, and/or operate the vehicle in a manner to eliminate and/or minimize damage due to the missing operator.

In certain other embodiments, the systems and techniques described herein may be used in other situations such as non-mobile systems and/or structures. For example, the systems and techniques may be used for assembly lines, mining, inventory management systems, and/or other such systems. In certain such embodiments, for example, the absence of one or more operators from one or more stations, areas, support vehicles, operating areas, and/or other such parts of the assembly lines, mining, inventory management systems, and/or other such systems may cause, for example, the one or more stations, areas, support vehicles, operating areas, assembly lines, subassembly lines, and/or other such parts to shut down, be placed in a default configuration, issue an operator missing warning, issue a message and/or warning to an electronic device, and/or other such actions.

For example, data from one or more imagers may determine that an operator has moved away from a station on an assembly line. A logic device controlling one or more systems and/or subsystems of the station and/or the assembly line may, for example, turn off the assembly line, turn off the sub-assembly line, turn off the system, issue a warning (e.g., through a warning klaxon, speaker system, screen, and/or other system), send a message to an electronic device, and/or take other such action. In another example, one or more imagers may determine that a mining operator has moved away from a control station of a mine. Accordingly, mining systems (e.g., mining robots) may be stopped and/or may be operated with default operating instructions.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
   a controller associated with a watercraft and configured to communicate with an imager, wherein the controller is configured to:
   receive image data from the imager, wherein the image data comprises a view of a designated area of the watercraft, wherein the designated area is a control area of the watercraft;
   determine an absence of an operator of the watercraft from the designated area based on the image data;
   determine a last known position of the watercraft, corresponding to approximately when a presence of the operator was last detected, based, at least in part, on the image data and/or on sensor data from environmental sensors and/or on sensor data from position sensors of the watercraft; and
   issue an operator absent instruction based, at least in part, on the determined absence of the operator, wherein the operator absent instruction indicates that the operator is missing from the watercraft.

2. The apparatus of claim 1, wherein
   the designed area is a helm of the watercraft,
   the operator controls the watercraft, and
   the operator absent instruction comprises instructions to power down the watercraft, place a propulsion system of the watercraft in neutral, prevent the operation of the vehicle, place the watercraft in an operator missing mode, and/or communicate an operator missing alert.

3. The apparatus of claim 2, wherein:
   the operator absent instruction comprises communicating an operator missing alert, and wherein the operator missing alert comprises a message to an electronic device and/or a warning alert issued to a warning system; and
   the electronic device comprises a cellphone, a tablet computer, a computer, a wearable computing device, and/or a remote computing device.

4. The apparatus of claim 1, wherein
   the imager comprises at least a first imager and at least a second imager, and
   the image data comprises:
   a first image data from the first imager; and
   a second image data from the second imager.

5. The apparatus of claim 4, wherein to determine the absence of the operator:
   the controller is further configured to:
   determine that first imager and/or the second imager is faulty and/or obscured, wherein
   to determine the absence of the operator is based on the first image data and/or the second image data from an other first imager and/or an other second imager, and
   the other first imager and/or the other second imager is non-faulty and/or un-obscured.

6. The apparatus of claim 4, wherein the first image data comprises images from a first area that includes the designated area, the second image data comprises images from a second area, and the determining the absence of the operator comprises determining the absence of the operator from the first area and the second area.

7. The apparatus of claim 6, wherein the imager is configured to record one or more images and/or a video for later analysis.

8. The apparatus of claim 1, wherein
   the designed area is a helm of the watercraft,
   the operator is a helmsman that pilots the watercraft, and
   the controller is further configured to: operate the watercraft to return to an area proximate to the last known position of the watercraft corresponding to approximately when the presence of the operator was last detected on the watercraft.

9. The apparatus of claim 8, wherein the environmental sensors and/or position sensors comprise at least one of a global navigation satellite system (GNSS) device, a visible spectrum imager, a thermal imager, a sonar device, a radar device, and/or a LIDAR device.

10. The apparatus of claim 1, wherein the imager is actuated and configured to image a plurality of different imaging areas on and/or around the watercraft,
    wherein a first imaging area includes the designated area, a second imaging area external to the designated area, and the determining of the absence of the operator comprises determining the absence of the operator from the designated area and the second imaging area.

11. The apparatus of claim 10, wherein the imager is actuated to move between a plurality of positions to image the plurality of different imaging areas.

12. The apparatus of claim 1, wherein
    the designed area is a helm of the watercraft,
    the operator controls the watercraft, and
    the controller is further configured to: determine an operating condition of the watercraft, wherein the operator absent instruction is issued based, at least in part, on the determined absence of the operator and the determined operating condition of the watercraft.

13. The apparatus of claim 1, wherein the watercraft comprises:
    the designated area; and
    wherein the imager is coupled to the watercraft.

14. A method comprising:
    receiving image data from an imager, wherein the image data comprises a view of a designated area of a watercraft, wherein the designated area is a control area of the watercraft;
    determining an absence of an operator of the watercraft from the designated area based on the image data;
    determining a last known position of the watercraft, corresponding to approximately when a presence of the operator was last detected, based, at least in part, on the image data and/or on sensor data from environmental sensors and/or on sensor data from position sensors of the watercraft; and issuing an operator absent instruction based, at least in part, on the determined absence of the operator, wherein the operator absent instruction indicates that the operator is missing from the watercraft.

15. The method of claim 14, wherein:

the designated area of the watercraft is a helm of the watercraft;

the operator controls the watercraft; and the operator absent instruction comprises instructions to power down the watercraft, place a propulsion system of the watercraft in neutral, prevent the operation of the vehicle, place the watercraft in an operator missing mode, and/or communicate an operator missing alert.

16. The method of claim 14, wherein:

the operator absent instruction comprises communicating an operator missing alert, and wherein the operator missing alert comprises a message to a device and/or a warning alert issued to a warning system; and wherein the secondary electronic device comprises a cellphone, a tablet computer, a computer, wearable computing device, and/or a remote computing device.

17. The method of claim 14, further comprising: wherein the imager comprises at least a first imager and at least a second imager, and receiving at least first image data from the at least first imager and at least second image data from the at least second imager.

18. The method of claim 17, wherein the first image data comprises images from a first area that includes the designated area, the second image data comprises images from a second area, and the determining the absence of the operator comprises determining the absence of the operator from the first area and the second area.

19. The method of claim 18, wherein the imager is configured to record one or more images and/or a video for later analysis.

20. The method of claim 18, further comprising:

operating the watercraft to return to an area proximate to the last known position of the watercraft corresponding to approximately when the presence of the operator was last detected, wherein the designated area of the watercraft is a helm of the watercraft and the operator is a helmsman that pilots the watercraft.

* * * * *